3,325,440
SILICONE RUBBER COMPOSITIONS WITH HEAT PRE-TREATED FILLERS AND SILICATE CURING AGENTS
Robert Smith-Johannsen, Glens Falls, N.Y., assignor to S-J Chemical Company, Fort Edward, N.Y., a partnership
No Drawing. Filed Sept. 5, 1962, Ser. No. 221,448
13 Claims. (Cl. 260—37)

This is a continuation-in-part of my prior applications Ser. No. 558,843, filed Jan. 13, 1956 now abandoned, and Ser. No. 2,573, filed Jan. 15, 1960.

This invention relates to new silicone rubber compositions having improved reversion resistance at high temperatures and to methods of making the same. More particularly, the invention relates to new silicone rubber compositions having improved reversion resistance at high temperatures comprising an organopolysiloxane convertible to cured, solid, elastic state, a filter and an unhydrolyzed organosilicate compound.

The new silicone rubber compositions of this invention are useful as electrical insulation and in other fields where silicone rubbers have heretofore been used.

Normally silicone rubber compositions can be used, as electrical insulation for example, at temperatures up to about 500° F. and for shorter periods up to about 600° F. when the silicone rubber is exposed to air and able to breathe. When these same silicone rubbers are placed or used in a sealed system or where the access to air is at a minimum, they revert or deteriorate very rapidly when subjected to temperatures of about 300° F. and above. This reversion of the silicone rubbers causes them to become soft and sticky, acquire a foul odor, discolor and rapidly lose their electrical and physical properties. Since silicone rubber in many of its applications must be sealed or used in the absence of air, this deterioration or reversion of the silicone rubber is highly disadvantageous.

I have found that silicone rubber having reversion resistance at high temperatures either in the presence or absence of air can be made by incorporating into an organopolysiloxane convertible to the cured, solid, elastic state an unhydrolyzed organosilicate, such as ethylorthosilicate, and a suitable filler and which composition contains substantially no hydroxyl groups. In order to prevent the presence of hydroxyl groups in the compositions and during the compounding, it is necessary to dry or dehydrate both the filler and the organosilicate, to remove therefrom substantially all of the hydroxyl groups present, if they are not already dry or substantially free from hydroxyl groups. This composition can then be applied to the surface desired and cured in the usual manner; advantageously with a curing accelerator such as benzoyl peroxide.

The new silicone rubber compositions of this invention are reversion resistant at high temperatures and will not deteriorate whether in a sealed system or exposed to air. They are unaffected by moisture and have electrical and physical properties equivalent to the best silicone rubber presently available.

The silicone rubbers or elastomers convertible to the cured, solid, elastic state, which can be used according to this invention, can be gummy solids or highly viscous masses depending upon the state of condensation. The silicone rubbers or elastomers which can be used will be referred to throughout this specification as convertible organopolysiloxanes.

Although convertible organopolysiloxanes with which the present invention is concerned are well known, for purposes of showing those skilled in the art the various convertible organopolysiloxanes which may be employed in the practice of the present invention, attention is directed to the convertible organopolysiloxanes disclosed and claimed in the patents to Agens No. 2,448,756 Sprung et al., No. 2,448,556, Sprung No. 2,484,595 Krieble et al. No. 2,457,688, Hyde No. 2,490,357 and Marsden No. 2,521,528.

Other convertible organopolysiloxanes containing the same or different silicon-bonded organic substituents (e.g methyl, ethyl, propyl, phenyl, tolyl, xylyl, benzyl, phenylethyl, naphthyl, vinyl, chlorophenyl, both methyl and phenyl radicals, methyl and vinyl radicals, phenyl methyl and vinyl radicals, etc.), connected to the silicon atoms by carbon-silicon linkages, may be employed without departing from the scope of this invention. The particular convertible organopolysiloxane used is not critical and may be any of those described in the foregoing patents which are generally and preferably obtained by condensation of a liquid organopolysiloxane containing an average from about 1.95, preferably from about 1.98, to about 2.2 organic groups per silicon atom. The usual condensing agents are those well known in the art and may include for instance ferric chloride hexahydrate, phenyl phosphoryl chloride, alkaline condensing agents, such as, potassium hydroxide, sodium hydroxide, etc.

These convertible organopolysiloxanes generally comprise polymeric diorganosiloxanes containing at most 5 mol percent, preferably at most 2 mol percent copolymerized monoorganosiloxane, for example, copolymerized monomethylsiloxane. Generally, it is preferred to use as the starting liquid organopolysiloxane from which the convertible organopolysiloxane is prepared, one which contains about 1.995 to 2.0 organic groups, such as methyl groups, per silicon atom and where more than about 95%, preferably, 99% of the silicon atoms in the polysiloxane contain two silicon-bonded organic groups. Dimethylpolysiloxane and partially phenyl substituted dimethylsiloxane convertible to the solid, cured, elastic state are advantageous organopolysiloxanes.

The organosilicates which can be used according to this invention include those coming within the general formula:

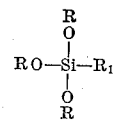

where R is a member selected from the class consisting of alkyl and halogen-substituted alkyl groups, and $R_1$ is a member selected from the class consisting of alkyl, aryl, aralkyl, alkaryl, alkoxy, aryloxy groups and halogenated derivatives of alkyl, aryl, aralkyl, alkaryl, alkoxy, and aryloxy groups. R in the above formula can be the same or different alkyl groups and R and $R_1$ may also be the same or different alkyl groups. For example, R can be methyl, ethyl, propyl, isopropyl, butyl, amyl, isoamyl, and the like, halogenated alkyls such as beta-chloroethyl radicals and the like. $R_1$ may be the same as R including halogenated derivatives or alkyl groups such as chlorinated, brominated, etc. radicals and the number of such halogens on the alkyl group can be varied.

In addition $R_1$ can include alkoxy and aryloxy groups corresponding to the general formula:

where Z can be, for example, an alkyl group of the same class as described above for R, or in addition Z can be an aryl, aralkyl, alkaryl radical such as phenyl, tolyl, xylyl, benzyl, phenylethyl, naphthyl and the like as well as various halogenated derivatives of the above radicals attached to silicon atoms through oxygen atoms.

ome more specific examples of organosilicates which be used are tertiary butoxy triethoxy silane, ditertiary oxy diethoxy silane, tertiary amyloxy triethoxy silane, rtiary amyloxy diethoxy silane and tetraethoxysilane.

have found that the organosilicates, especially ethyl- nosilicate, corresponding to the general formula:

$$(RO)_4 Si$$

ere R is an alkyl group as defined above, are very advantageous organosilicates which can be used according to this invention.

Various fillers to increase the strength of the resulting ed silicone rubber, and to impart to it special or desired properties such as tensile strength compression set, I the like, can be used. Examples of some fillers which be incorporated into the convertible organopolysiloxane are silica such as that marketed by Godfrey Cabot under the trade name "Cabosil" and sometimes referred to as De Gussa silica, clay such as that marketed Southern Clay Co. under the trade name "Whitex," d calcium carbonate.

The amount of filler which can be used will vary depending upon the particular filler used, the particular curing accelerator, the application for which the heat-converted solid, elastic product is intended, the particular ganosiloxane used, etc. When using Cabosil for example, 40 parts by weight for every 100 parts by weight of convertible organosilicate is advantageous.

This invention also includes new silicone rubber comprising a convertible organopolysiloxane containing high adings of calcium carbonate in excess of about 65 parts weight for every 100 parts by weight of the organolysiloxane or in excess of 65% by weight of the calcium carbonate based on the weight of the convertible ganopolysiloxane. Prior attempts to incorporate large nounts of calcium carbonate in excess of about 65% weight in convertible organopolysiloxane resulted in depolymerization or deterioration of the organopolysiloxane. The organopolysiloxane becomes soft and can longer satisfactorily be cured to the solid elastic state. have found that if the calcium carbonate is first rendered free from substantially all hydroxyl groups normally associated with calcium carbonate and then compounded into the organopolysiloxane, such as on rubber compounding rolls, that amounts in excess of about 65% y weight can be incorporated into the organopolysiloxane ithout depolymerization or deterioration or otherwise dversely affecting the organopolysiloxane. Amounts up and in excess of 100% by weight based on the weight the organopolysiloxane have been successfully incorporated into convertible organopolysiloxanes without adverse effects according to this invention.

I have also found that substantially all of the hydroxyl roups normally present in calcium carbonate can be iminated for the purpose of this invention by heating he calcium carbonate in trays at about 250° C. for one our for every inch of depth of the calcium carbonate. After the calcium carbonate has been heated, it should e cooled to a temperature insufficient to adversely affect he organopolysiloxane before it is mixed therewith. A emperature of about 60° C. is satisfactory. It is also advantageous to mix the calcium carbonate with the organopolysiloxane while it is still warm to prevent it from icking up water.

The new compositions of this invention containing mounts of calcium carbonate in excess of about 65% y weight have increased physical strength and hardness which widens the useful fields of calcium carbonate filled ilicone rubbers.

The organopolysiloxane compositions of this invention an be cured effectively with or without the use of curing agents, as it is well known in the art that silicone rubbers can be cured by use of heat alone. Various curing agents, however, such as benzoyl peroxide, and tertiary butyl perbenzoate can be advantageously used so long as the particularly curing agent does not introduce groups which will deteriorate or cause deterioration in the compositions at high temperatures. These curing agents may be present in various amounts as is well known, ranging from about 0.1 to as high as 4 to 8% by weight based on the weight of the organopolysiloxane. 1 to 4% by weight is preferable.

In compounding the new composition of this invention, it is important a substantially anhydrous condition be maintained during the initial mixing of the calcium carbonate and organosilicate.

The new compositions of this invention can be prepared in various manners so long as the filler and the organosilicate are substantially free from hydroxyl groups compounded with the organopolysiloxane. One manner of forming the composition of this invention is to first dry the filler, by heat for example, until it is substantially free from water or hydroxyl groups and then compounded it with the convertible organopolysiloxane on rubber compounding rolls. The compounded organopolysiloxane may be in a homogeneous mass or in sheet form depending upon whether the organopolysiloxane used is in the form of a viscous mass or a gum. It is important to assure that no hydroxyl groups are present during the compounding or are introduced by compounding or application techniques.

In order to insure that the filler remains substantially free from water, it is also advantageous to compound it into the organopolysiloxane while the filler is still warm. Soon after the filler has been thoroughly dispersed throughout the organopolysiloxane, the organosilicate is added. Before the organosilicate is added, provided it is not already free from hydroxy groups, it is advantageously dried. The organosilicate can be dried by storing it over calcium hydride. A curing agent such as benzoyl peroxide can then finally be added if desired.

Thereafter the mixture can be applied to the surface to which adhesion is desired. The total assembly can then be subjected to a heat curing operation, preferably under pressure, to form a cured, solid, elastic product. Some examples of the types of surfaces to which the new compositions can be applied and adhered are glass, glass cloth, ceramic, plastic and the like; and metallic surfaces such as copper, brass, steel, magnesium, aluminum and the like.

Another advantageous method of preparing the new compositions of this invention is to first eliminate the hydroxyl groups, if any, normally present in the filler by heating and then add the dry unhydrolyzed organosilicate to the warm calcium carbonate. The mixture of organosilicate and calium carbonate can then be mixed on rubber compounding rolls with the organopolysiloxane.

The new compositions of this invention can be calendered onto such surfaces or they may be coated thereon by dip coating, using a solvent such as xylene to control the viscosity of the composition for ease in application. When using a solvent with the new silicone rubber compositions care should be taken to insure that the solvent is dry before dissolving the organopolysiloxane in it. If the solvent is wet, the resulting coatings will lose their anti-reversion property. Calendering or the use of a dry solvent are advantageous application processes. Application processes which tend to easily permit the new composition to pick up water, such as by spraying should be avoided or special precautions taken to prevent the picking up of water by the composition and to prevent hydrolysis of the components which will adversely affect the anti-reversion properties.

The curing temperature may vary depending upon the length of time, the particular organopolysiloxane used, the filler used, etc. The curing temperatures generally used range from about 100° to 200° C. and the time varies from a few seconds to several hours. This will generally convert the organopolysiloxane to a solid, elastic product which they may be further heat treated or baked at higher temperatures on the order from about 200° to 250° C. for longer periods of time, for example, for about 1 to 24 hours.

The amount of organosilicate which can be used ranges from a trace to about 8 parts by weight for every 100 parts by weight of the convertible organopolysiloxane or from an amount effective to impart to the organopolysiloxane the anti-reversion properties to about 8% by weight based on the weight of the organopolysiloxane. The reversion resistant properties of the new silicone rubber compositions of this invention are imparted to the organopolysiloxane with just a trace of organosilicate. Generally the use of amounts in excess of 8 parts by weight of organosilicate for 100 parts by weight of organopolysiloxane diminishes the physical and electrical properties inherent in silicone rubbers, although it does not apparently affect the anti-reversion properties. Most organopolysiloxanes are also soluble in most organosilicates and the presence of too much organosilicate will result in an unmanageable composition which is difficult to apply to surfaces. Amounts in excess of 8 parts by weight of an organosilicate for every 100 parts by weight of organopolysiloxane can at times, however, be used, depending upon the resultant use to which the cured silicone rubbers are to be put, the particular convertible organopolysiloxanes used, etc. I have found that it is advantageous to incorporate about five parts by weight of organosilicate for every 100 parts by weight of the convertible organopolysiloxane.

In order that those skilled in the art may better understand the present invention, the following examples are given by way of illustration only and are not to be considered as a limitation. All parts are by weight.

*Example 1.*—50 parts of a calcium carbonate filler, marketed by C. K. Williams under the trade name Albacar, were first heated to 250° C. in trays in a circulating air oven for one hour for every inch of depth of the calcium carbonate filler. The calcium carbonate while it was still warm was thoroughly compounded into 100 parts of dimethylpolysiloxane convertible to be cured, solid, elastic state. The convertible dimethylpolysiloxane used in this example is marketed by the General Electric Company under the tradename SE 76. As soon as the calcium carbonate was thoroughly dispersed throughout the dimethylpolysiloxane, 5 parts of dry unhydrolyzed ethyl orthosilicate were added and finally 3 parts of benzoyl peroxide.

The composition produced in accordance with this invention was then calendered onto glass cloth in a 0.020 inch thick film, cured at about 150° C. for about 10 minutes then baked one hour at 230° C.

A portion of the composition produced in accordance with this example was sealed into a glass tube and heated for 12 hours at 550° F. Examination of the product showed that there was no softening, deterioration or reversion.

Another portion of the product of Example 1 was exposed to air for two months and then sealed into a glass tube and heated for 12 hours at 550° F. There were no signs of reversion or deterioration of the rubber.

Another portion was sealed into a glass tube together with a small amount of water, and heated for 12 hours at 550° F. There was no resulting reversion, softening or deterioration of the rubber even in the presence of the water.

The composition produced in accordance with this example also possessed physical and electrical properties equivalent to the best silicone rubber available in the past.

*Example 2.*—100 parts of calcium carbonate were dried in trays in a circulating air oven at 250° C. for one hour for every inch in depth of the calcium carbonate and compounded on rubber compounding rolls with dimethylpolysiloxane gum convertible to the cured, solid, elastic state until a homogeneous mixture was obtained. The dimethylpolysiloxane used was one marketed by the General Electric Co. under the trade name SE 76. The resulting composition was not adversely affected in any manner nor was there any deploymerization or deterioration of the gum during the compounding.

*Example 3.*—To the composition produced in accordance with Example 2, 4 parts by weight of dry, unhydrolyzed ethylorthosilicate free from hydroxyl groups were added together with 3 parts by weight of benzoyl peroxide and dip coated onto heat desized glass cloth from a solution in dry xylene to a thickness of about 0.02 inch. The assembly was then cured by heating it to a temperature of about 230° C. for 5 to 10 minutes. The assembly was then baked out in an oven at a temperature of about 250° C. for one hour.

The resulting cured silicone rubber possessed much improved tensile strength over prior silicone rubbers and exhibiting a hardness of Share A Durometer 50.

The composition of Example 3 was also heated in air in a sealed glass tube both in the presence and absence of water to 550° F. for 12 hours and in each instance there was no evidence of reversion, deterioration, depolymerization or other loss of physical and electrical properties.

*Example 4.*—40 parts of silica marketed under the trade name Cabosil by Godfrey Cabot Co. were placed in trays to a depth of about ½ inch and heated in a circulating air oven at about 260° C. for about one hour. The dried silica was then cooled to about 60° C. and mixed with three parts of ethylorthosilicate and the resulting mixture compounded with 100 parts of a convertible dimethylpolysiloxane until all of the components were thoroughly mixed. 2 parts of benzoyl peroxide were then added to the mixture and a film of the mixture calendered onto glass cloth and cured at about 230° C. for 10 minutes. The cured assembly was then baked in an oven for one hour at about 250° C.

The resulting cured dimethylpolysiloxane when heated in air at about 575° F. for about 72 hours had a weight loss of 1.7% based on the weight of the dimethylpolysiloxane, and gave no evidence of reversion when heated in a sealed glass tube at about 575° F. for about 18 hours.

*Example 5.*—50 parts of calcium carbonate heat treated as in Example 1 were mixed with 5 parts of ethylorthosilicate and compounded while still warm on rubber compounding rolls with 100 parts of partially (16 mol percent) phenyl substituted dimethylpolysiloxane gum. 3 parts of benzoyl peroxide were then added and the resulting composition knife coated onto desized glass cloth, cured by heating at about 230° C. for 10 minutes, and baked in an oven for about one hour at about 250° C.

The cured assembly showed no evidence of reversion when heated to 575° F. for 18 hours in a sealed glass tube.

*Example 6.*—50 parts of calcium carbonate heat treated as in Example 1 were mixed with 5 parts tertiary butyl triethoxy silane while still warm and the warm mixture compounded with 100 parts of a convertible dimethylpolysiloxane and 3 parts of benzoyl peroxide added. The resulting composition was calendered onto glass cloth, cured at about 230° C. for about 10 minutes and then baked in an oven at about 250° C. for 30 minutes.

The cured assembly showed no signs of deterioration or reversion when heated to about 550° F. for 18 hours in a sealed glass tube.

*Example 7.*—40 parts of clay marketed under the trade name Whitex by the Southern Clay Co. were heat treated in the same manner as the silica in Example 4. 5 parts of ethylorthosilicate free from hydroxyl groups were then added to the heat treated clay while it was still warm. This mixture was then compounded while it was still warm with 100 parts of a convertible dimethylpolysiloxane on rubber compounding rolls. The resulting composition was then calendered onto desized glass cloth and cured at about 230° C. for 10 minutes. The cured assembly was then baked in an oven for about one hour at about 250° C.

The resulting cured dimethylpolysiloxane was heated in at about 575° F. for about 72 hours. The calculated weight loss was 1.8 percent based on the weight of the ethylpolysiloxane. The composition was then sealed in a glass tube and heated at about 575° F. for about 18 hours. After this heating period, there was no odor, the composition was not tacky, it remained flexible, and there was otherwise no evidence of reversion.

*Example 8.*—50 parts of calcium carbonate were heat treated as in Example 1 and mixed with 5 parts of ethylorthosilicate while the calcium carbonate was still warm. This mixture while still warm was then compounded on rubber compounding rolls with 100 parts of convertible methylpolysiloxane. 3 parts of tertiary butyl perbenzoate were then added and the resulting composition calendered onto desized glass cloth, cured by heating at about 230° F. for about 10 minutes and baked in an oven for about 1 hour at 250° C.

The resulting cured assembly showed no evidence of reversion when heated to 550° F. for 12 hours in a sealed glass tube.

I claim:

1. A composition of matter comprising an organopolysiloxane convertible to the cured solid elastic state, which organopolysiloxane consists essentially of monovalent organic radicals and silicon and oxygen atoms in which the organic radicals are attached to the silicon atoms by carbon atom silicon linkages in such ratios that there are present from about 1.95 to about 2.2 organic radicals per silicon atom, a filler and an unhydrolyzed organosilicate, said composition being free from hydroxyl groups.

2. The composition of claim 1 in which the filler is a member of the group consisting of silica clay and calcium carbonate and mixtures thereof.

3. The composition of claim 1 in which the organosilicate is ethylorthosilicate.

4. The composition of claim 2 in which the organic radicals of the organopolysiloxane are methyl radicals.

5. The composition of claim 2 in which the organic radicals of the organopolysiloxane are methyl and phenyl radicals.

6. A composition of matter comprising organopolysiloxane convertible to a cured solid elastic state, which organopolysiloxane consists essentially of monovalent organic radicals and silicon and oxygen atoms in which the organic radicals are attached to silicon atoms by carbon linkages in such ratios that there are present from about 1.95 to 2.2 organic radicals per silicon atom, in excess of about 65% by weight of calcium carbonate based on the weight of organopolysiloxane and an unhydrolyzed organosilicate, said composition being free from hydroxyl groups.

7. The process of producing silicone rubber stock compositions which comprises mixing a filler and an unhydrolyzed organosilicate which are free from hydroxyl groups with an organopolysiloxane convertible to the cured, solid, elastic state and which organopolysiloxane consists essentially of monovalent organic radicals and silicon and oxygen atoms in which the organic radicals are attached to silicon atoms by carbon-silicon linkages in such ratios that they are present from about 1.95 to about 2.2 organic radicals per silicon atom.

8. The process of producing silicone rubber stock compositions which comprises first mixing at least one member of the group consisting of silica, clay and calcium carbonate free from hydroxyl groups with an organopolysiloxane convertible to the cured, solid, elastic state which consists essentially of monovalent organic radicals and silicon and oxygen atoms in which the organic radicals are attached to silicon atoms by carbon-silicon linkages in such ratios that there are present from about 1.95 to about 2.2 organic radicals per silicon atom under conditions to prevent the components from picking up moisture, then adding thereto an unhydrolyzed organosilicate free from hydroxyl groups soon after the completion of the mixing of the filler and the organopolysiloxane.

9. The process of producing silicone rubber stock compositions which comprises drying a filler to remove substantially all of the hydroxyl groups associated therewith, adding to the filler dry unhydrolyzed organosilicate, and mixing the filler and organosilicate with an organopolysiloxane convertible to the solid elastic state which organopolysiloxane consists essentially of monovalent organic radicals and silicon and oxygen atoms in which the organic radicals are attached to silicon atoms by carbon-silicon linkages in such ratios that there are present from about 1.95 to about 2.2 organic radicals per silicon atom.

10. The process according to claim 9 in which the filler is a member of the group consisting of silica clay and calcium carbonate and mixtures thereof.

11. The process of producing a cured silicone rubber having reversion resistance at high temperatures in the presence or absence of air which comprises mixing a filler and an unhydrolyzed organosilicate which are free from hydroxyl groups with an organopolysiloxane convertible to the cured, solid, elastic state which organopolysiloxane consists essentially of monovalent organic radicals and silicon and oxygen atoms in which the organic radicals are attached to silicon atoms by carbon-silicon linkages in such ratios that they are present from about 1.95 to about 2.2 organic radicals per silicon atom, and subsequently adding a curing agent and heating the mixture to cure the organopolysiloxane to the solid elastic state.

12. The process of claim 11 in which the filler is a member of the group consisting of silica, clay and calcium carbonate and mixtures thereof and the organosilicate is ethylorthosilicate.

13. A cured silicone rubber produced according to the process of claim 11.

References Cited

UNITED STATES PATENTS

| | | | |
|---|---|---|---|
| 2,467,853 | 4/1949 | Poskitt et al. | 260—37 |
| 2,521,528 | 9/1950 | Marsden | 260—37 |
| 2,571,039 | 10/1951 | Hyde | 260—37 |
| 2,744,878 | 5/1956 | Smith-Johannsen | 260—37 |
| 2,927,907 | 3/1960 | Polmanteer | 260—37 |
| 3,065,194 | 11/1962 | Nitzsche et al. | 260—37 |
| 3,108,985 | 10/1963 | Weyer. | |

FOREIGN PATENTS 526,807   3/1954   Belgium.

OTHER REFERENCES

W. J. Bobear, Rubber Age (New York), volume 84, 1958, pages 448–450.

MORRIS LIEBMAN, *Primary Examiner.*

ALEXANDER H. BRODMERKEL, *Examiner.*

J. W. BEHRINGER, J. E. CALLAGHAN,
*Assistant Examiners.*